United States Patent [19]
Ellsworth

[11] 3,957,072
[45] May 18, 1976

[54] FLUID FLOW CONTROL VALVE
[75] Inventor: Eric D. Ellsworth, Allen Park, Mich.
[73] Assignee: Ford Motor Company, Dearborn, Mich.
[22] Filed: Dec. 16, 1974
[21] Appl. No.: 533,372

[52] U.S. Cl. ................................................. 137/38
[51] Int. Cl.² ............................................ F16K 17/36
[58] Field of Search ............... 123/198 DB; 137/38, 137/43; 180/104

[56] References Cited
UNITED STATES PATENTS
2,619,185 11/1952 Rudisill ............................ 137/38 X
3,807,423 4/1974 Engel .................................. 137/38

Primary Examiner—Robert G. Nilson
Attorney, Agent, or Firm—Robert E. McCollum; Keith L. Zerschling

[57] ABSTRACT

A fluid flow shut-off device has a number of valves which upon lateral tilting movement of the device selectively move to block flow, regardless of the direction of tilting movement.

5 Claims, 11 Drawing Figures

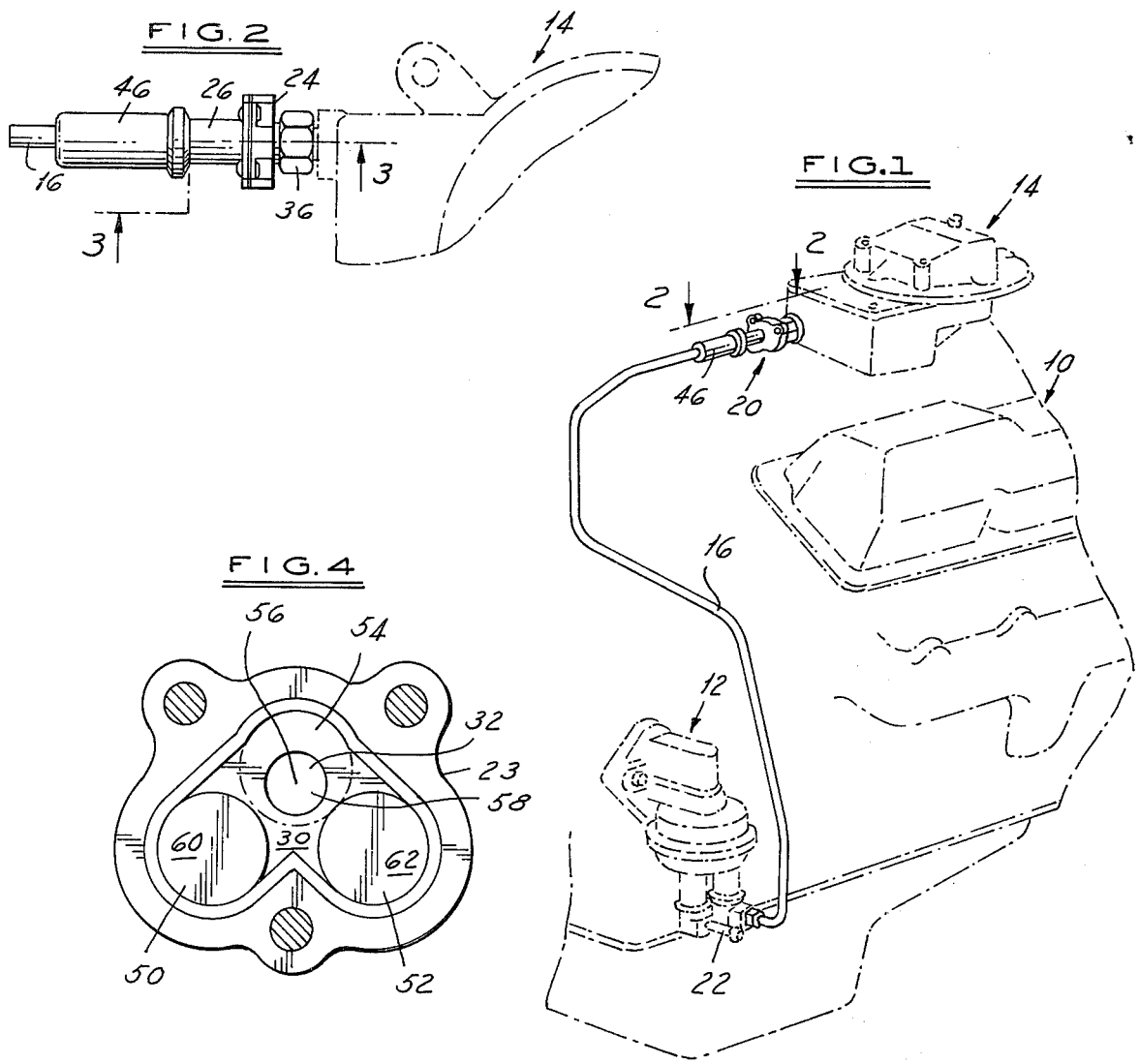
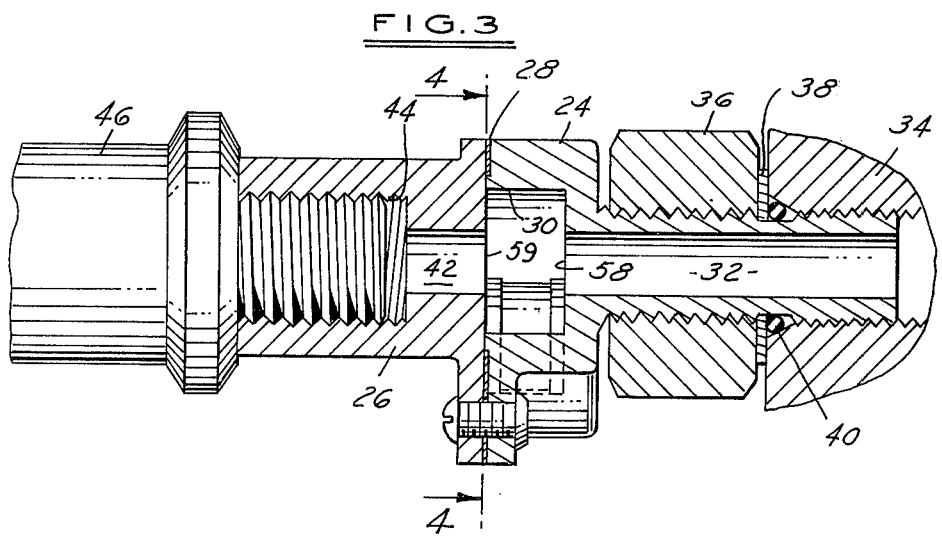

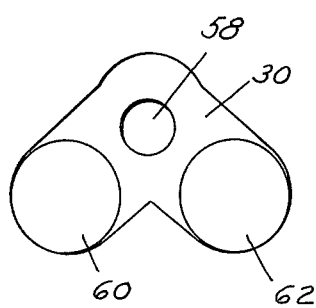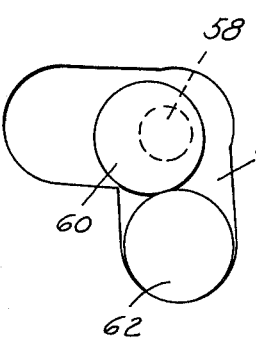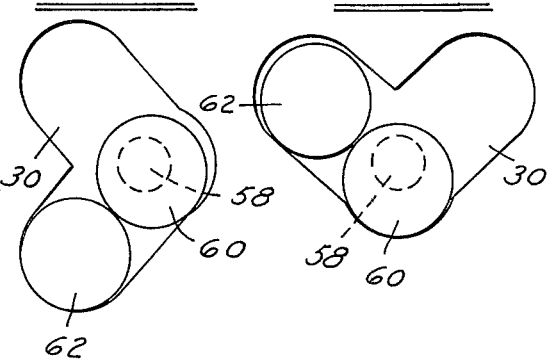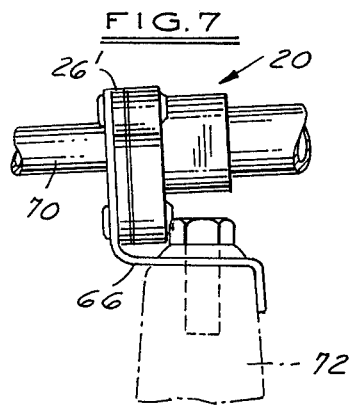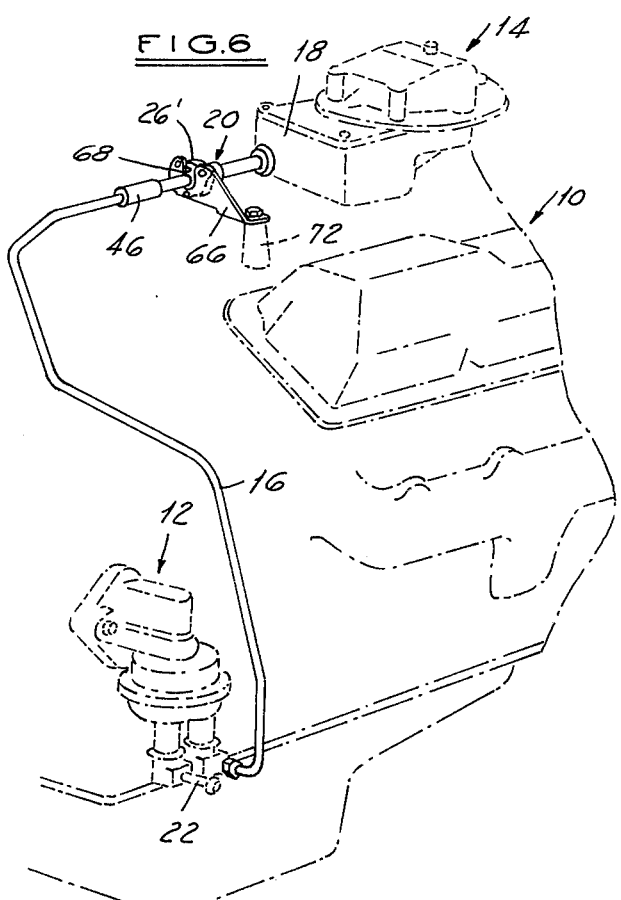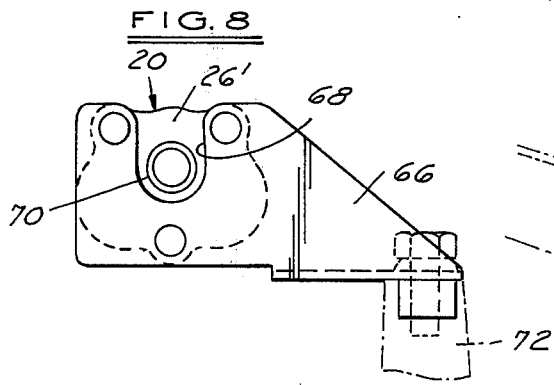

FLUID FLOW CONTROL VALVE

This invention relates in general to a fluid flow shutoff valve. More particularly, it relates to a device that will automatically shut off or block the flow of fuel in an engine fuel line when the motor vehicle rolls over or otherwise attains an attitude in which fuel normally would escape from the system.

Devices are known to prevent the spill of fuel from an engine when a motor vehicle is involved in an accident causing it to turn over or tip sufficient to lose fuel. An example is shown in U.S. Pat. No. 2,619,185, Rudisill, issued Nov. 25, 1952, "Safety Fuel Cut-Off for Vehicles". Rudisill shows a line connecting a fuel tank to an engine carburetor. The line contains a triangularly-shaped extension in which are located three gravity movable valve members. The valve members are conically-shaped to cooperate with tapered portions of the line extensions so that as soon as the vehicle rolls beyond a predetermined angle in either direction, at least one of the valve members will seat to seal off flow through the line.

The above construction requires three separate valves and three separate mating line portions to assure blocking of fuel flow in all attitudes of the line other than upright. This results in an expensive construction.

The invention provides an economical engine fuel flow control device that positively shuts off fuel flow when desired, and yet has a mimimum number of valves and a simplified construction. More particularly, the invention consists of a hollow housing that is disposed in the fluid line at right angles to the direction of fluid flow and contains a number of valve means that move between alternate positions individually blocking or unblocking the fluid line as a function of the direction of tilting movement of the housing upon rollover of the vehicle.

It is a primary object of the invention, therefore, to provide a fluid flow control device that is simple in construction, has a minimum of parts, is economical to manufacture, and is reliable in operation.

It is a further object of the invention to provide a fluid flow control device that has a housing defining a chamber containing a number of rollable valve means that move selectively upon a predetermined tilting of the housing to alternately and selectively block flow through a fluid line so long as the housing remains other than in its initial upright position.

It is a still further object of the invention to provide a control device of the type described which includes a flat hollow housing positioned on end or in an upright position and extending in a direction essentially at right angles to the direction of fluid flow, the housing having a chamber with an inverted heart-like shape in its normal or initial position, the lower angularly-extending portions of the housing each containing a disc valve that is guided by the shape of the chamber to be rollable selectively as a function of the direction of angular tilting movement of the housing about the axis of the fluid flow into the upper apex portion of the chamber containing fluid inlet and outlet ports so as to block flow through the ports at all positions of the housing other than in the initial position.

Other objects, features and advantages of the invention will become more apparent upon reference to the succeeding detailed description thereof, and to the drawings illustrating the preferred embodiment thereof; wherein, FIG. 1 is a perspective elevational view of an internal combustion engine embodying the invention;

FIG. 2 is an enlarged portion of a detail taken on a plane indicated by and viewed in the direction of the arrows 2—2 of FIG. 1;

FIG. 3 is an enlarged cross-sectional view taken on a plane indicated by and viewed in the direction of the arrows 3—3 of FIG. 2;

FIG. 4 is a cross-sectional view taken on a plane indicated by and viewed in the direction of the arrows 4—4 of FIG. 3;

FIGS. 5a, 5b, 5c, and 5d are schematic illustrations of the device shown in FIG. 4 and illustrating the disc valves of the invention in various operative positions they attain upon an angular tilting of the housing forming a part of the invention;

FIG. 6 is a perspective view corresponding to that shown in FIG. 1 and illustrating another embodiment of the invention; and, FIGS. 7 and 8 are enlarged side and end elevational views of a detail shown in FIG. 6.

FIG. 1 illustrates a portion of a V-type internal combustion engine 10 having a fuel pump 12 and a downdraft type carburetor 14. A fuel supply line 16 connects the fuel pump and the float bowl 18 of the carburetor, and contains the flow control device 20 of the invention. The fuel pump 12 in this case has an inlet fitting 22 that is adapted to be connected to a gasoline tank or fuel reservoir, not shown.

As best seen in FIGS. 2, 3 and 4, device 20 has a box-like housing 23 that is positioned on end or in an upright position. The housing consists of two cast parts, 24 and 26 riveted together, with a sealing gasket 28 between. The right hand portion 24, as seen in FIG. 3, is cup-shaped to define a valve chamber 30 that is intersected at right angles by an axial fuel passage 32. The portion defining the fuel passage 32 is externally threaded for mounting directly to a portion 34 of the carburetor body, by means of a lock nut 36 and a washer 38 sealing against an O-ring 40.

The mating housing portion 26 has a fuel passage 42 that is axially aligned with passage 32. Passage 42 joins chamber 30 to a threaded recess 44 into which can be inserted one end of a conventional fuel filter 46. The opposite end of the fuel filter, as seen in FIG. 1, is connected to fuel line 16.

As best seen in FIG. 4, chamber 30 has a clover or inverted heart-like shape in cross section, with three nodular or finger like parts 50, 52 and 54 interconnected but at angles to each other. The axes of fuel flow passages 32 and 42 are coincident with the axis 56 of the upper node 54. This also, of course, makes it coincident with the axis of ports 58 and 59 defined by the intersection of chamber 30 with fuel passages 32 and 42.

Each of the lower angularly extending nodular portions 50 and 52 contains a flat disc valve 60, 62 that at times is adapted to roll by gravity into and out of the position shown, from and towards the apex or nodular portion 54. The depth of chamber 30 and the width of each finger portion is made just slightly greater than the thickness and diameter respectively of the rollable discs contained within the chamber so that the flatness and shape of the housing walls serve to guide the movement of the discs.

When the fuel shut off device 20 is installed in line 16, it is located at the attitude indicated in FIGS 1 and 4, which is referred to as the upright position. Thereafter, so long as the motor vehicle remains in a normal essentially upright position, the discs 60 and 62 remain in the positions shown in FIGS. 4 and 5a, permitting the free flow of fuel through the ports 58 and 59. However, as soon as the vehicle tilts a predetermined amount laterally about its longitudinal axis, i.e., the axis parallel to the axis of the fuel flow through ports 58 and 59, by an angle sufficient to tilt the housing clockwise from the FIG. 5a position, for example, to the FIG. 5b position, then disc 60 will roll by gravity progressively to the positions shown in FIGS. 5b, 5c and 5d covering the ports 58 and 59. This will prevent further flow of fuel through line 16 into the carburetor and thereby minimize spillage. The pressure of fuel against the side face or surface of the disc will then aid in sealing the disc against one of the ports, depending upon the direction of fuel pressure application. Continued clockwise movement of the housing by continued rollover of the vehicle, will maintain disc 60 in the position blocking fuel flow until the vehicle makes essentially a complete turn of 360° returning it and the housing again to the position shown in FIG. 5a. At this point, the disc 60 will have rolled back by gravity into the nodular portion 50 and unblock the fuel ports 58 and 59.

A similar action occurs should the vehicle roll over or back in the opposite or counterclockwise direction. In this latter case, the disc 62 rather than disc 60 would move to cover the fuel ports 58 and 59, in a manner similar to that shown in FIGS. 5a through 5d, inclusive, but in the reverse direction. It will be seen, therefore, that regardless of the direction of tilting movement of the vehicle about a longitudinal axis, one or the other of the discs 60, 62 will move into the nodular portion 54 to block flow through the ports 58 and 59.

It will be seen, therefore, that the housing of device 20 rotates about the axis 56 of that portion of the fuel line in which it is installed, and by the major portion of the housing extending laterally essentially at right angles to the direction of fuel flow, the discs 50 or 52 can roll selectively as a function of the direction of tilting movement to cover the fuel ports 58 and 59 during all attitudes of the housing other than the normal upright position.

FIGS. 6, 7 and 8 show an alternate method of mounting control device 20 on a part of the engine instead of to the carburetor. More particularly, in this case, one end of a right angle bracket 66 is riveted to the housing portion 26', with a cutout 68 to accommodate a fuel line adapter 70. The adapter is connected or inserted in the adjacent end of a flexible neoprene line connected to the fuel filter. The opposite end of bracket 66 is bolted to a stud 72 on the engine, as seen in FIG. 6.

The operation of the FIG. 6–8 modification is the same as that described in connection with FIGS. 1, 2 and 5, and, therefore, is not repeated.

From the foregoing, it will be seen that the invention provides a fluid flow control device that in its normally installed or initial position is located in an upright position extending laterally essentially at right angles to the direction of fuel flow through the line at that point; that the housing consists of a pair of flat parallel members with a connecting wall to define a chamber, the chamber being formed with an upstanding and a pair of depending finger-like portions extending at angles to each other and spaced circumferentially from each other; that the chamber contains a number of disc valves one less than the number of finger or nodular portions, that are selectively and individually rollable into a position to block flow of fluid past the valve when the housing attains a predetermined angular tilted altitude away from its normal upright position; the line remaining blocked until the housing returns to the upright position. It will also be seen that regardless of the direction of angular tilting, at least one of the valve members will cover and block the fluid line at all times other than when the shutoff device is in an upright normal position.

While the invention has been shown and described in its preferred embodiments, it will be clear to those skilled in the arts to which it pertains that many changes and modifications may be made thereto without departing from the scope of the invention. It will be clear, for example, that the circumferential or angular spacing between the nodular or finger-like portions 50, 52 and 54, as seen in FIG. 4, can be varied as desired to vary the amount of tilt permitted before fluid flow shut off is attained.

I claim:

1. A fluid flow control device comprising a hollow housing having a single fluid inlet port and a single fluid outlet port axially aligned therewith, the major portion of the housing extending laterally of and essentially at right angles to the axis of the ports and defining a chamber containing valve means movable laterally across one of the ports to block flow through the same in response to a predetermined tilting angular movement of the housing in either direction about the axis of the ports from an initial position, said chamber having a clover-like shape with a plurality of modes extending at angles to each other, the ports being located in one of the nodes, the valve means being located in the remaining of the plurality of nodes and movable therefrom into the one node, the valve means comprising a number of valves greater than one and one less than the number of nodes.

2. A control device as in claim 1, the valve means comprising a plurality of discs each rollable separately across the one port at times and alternating with the remaining of the plurality of discs as a function of the tilting movement of the housing to maintain the one port blocked at all times when the housing is in a position other than the initial position.

3. A control device as in claim 1, the housing consisting of a pair of flat parallel members with a connecting wall, the housing defining a chamber having an inverted heart-like shape when in the initial position with an upper apex portion and two lower angled portions, the ports being located in aligned parts of the members in the upper apex portion, the lower portions each containing a flat disc valve seperately and selectively rollable towards the ports to block at least one of the same upon a predetermined angular tilting movement of the housing in either direction from the initial position.

4. A fluid flow control device comprising a tiltable housing having a clover-like chamber defined by a plurality of finger-like spaced parts each extending at an angle to and interconnected to the other, one part containing the fluid inlet and fluid outlet for the device, each of the remaining of the plurality of parts containing a valve slidable therein, whereby predetermined pivotal movement of the housing in either direction about the axis of the one part, from a first attitude in which the fluid inlet and outlet are unblocked while the respective valves are maintained in each of the remaining parts of the chamber effects the movement by gravity of each of the valves to various positions relative to each other and to the inlet and outlet to maintain the fluid inlet and outlet covered at all attitudes of the housing other than the first attitude.

5. A fluid flow control device comprising a flat hollow tiltable housing having an upright attitude and extending in a direction transverse to the direction of fluid flow and having a single fluid inlet port and a single fluid outlet port axially aligned with each other in the direction of fluid flow, the housing containing a pair of rollable valve members each movable by gravity from a first position unblocking either of the ports to a second position blocking one of the ports, the valve members being individually rollable across one of the ports in response to a predetermined angular tilting movement of the housing about the axis of the ports and selectively rollable as a function of the direction of tilting movement of the housing to maintain at least one of the valve members covering one of the ports at all attitudes of the housing other than the upright attitude.

* * * * *